Jan. 22, 1963 G. F. PAPPAS 3,074,878
SHORT CONTACT TIME SYSTEM
Filed Oct. 18, 1957 3 Sheets-Sheet 3
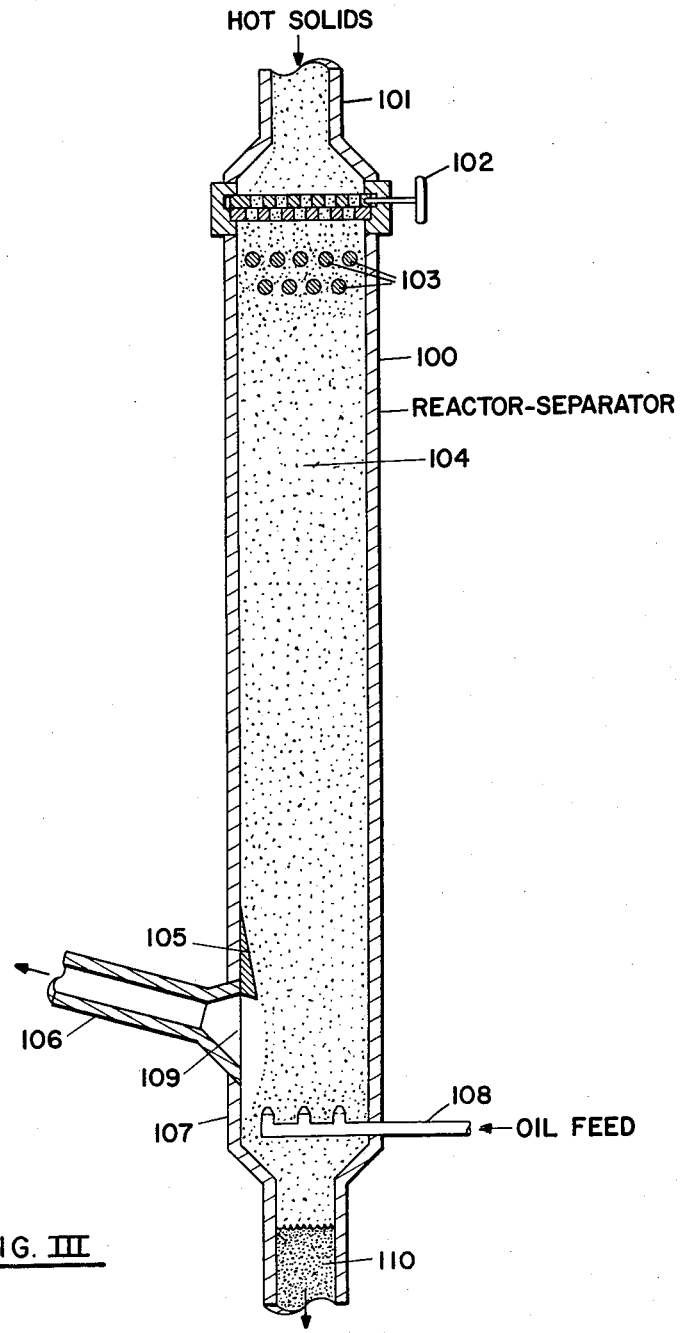
FIG. III
George F. Pappas  Inventor
By *George J. Silbery*  Attorney

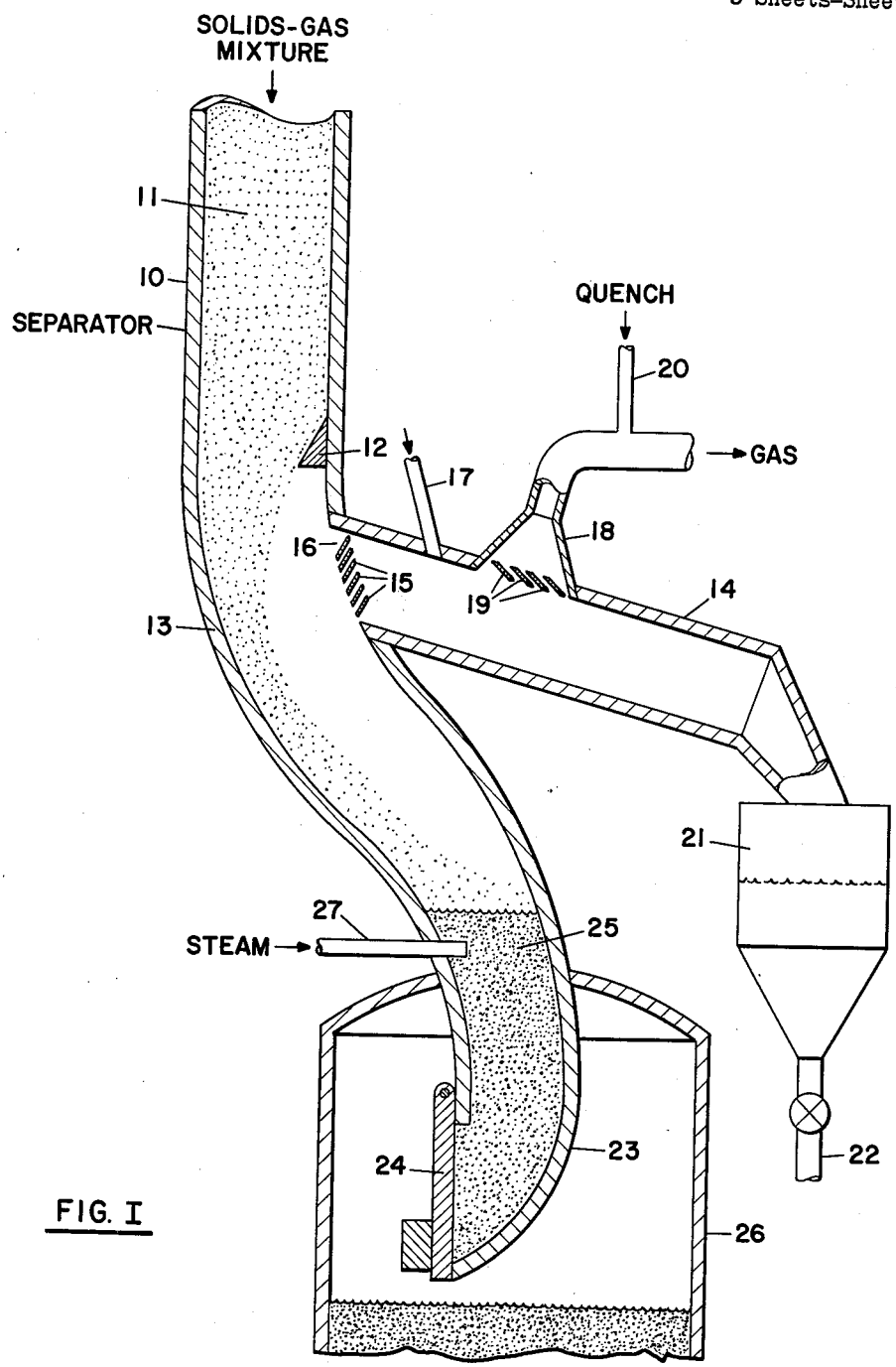
FIG. I
George F. Pappas   Inventor

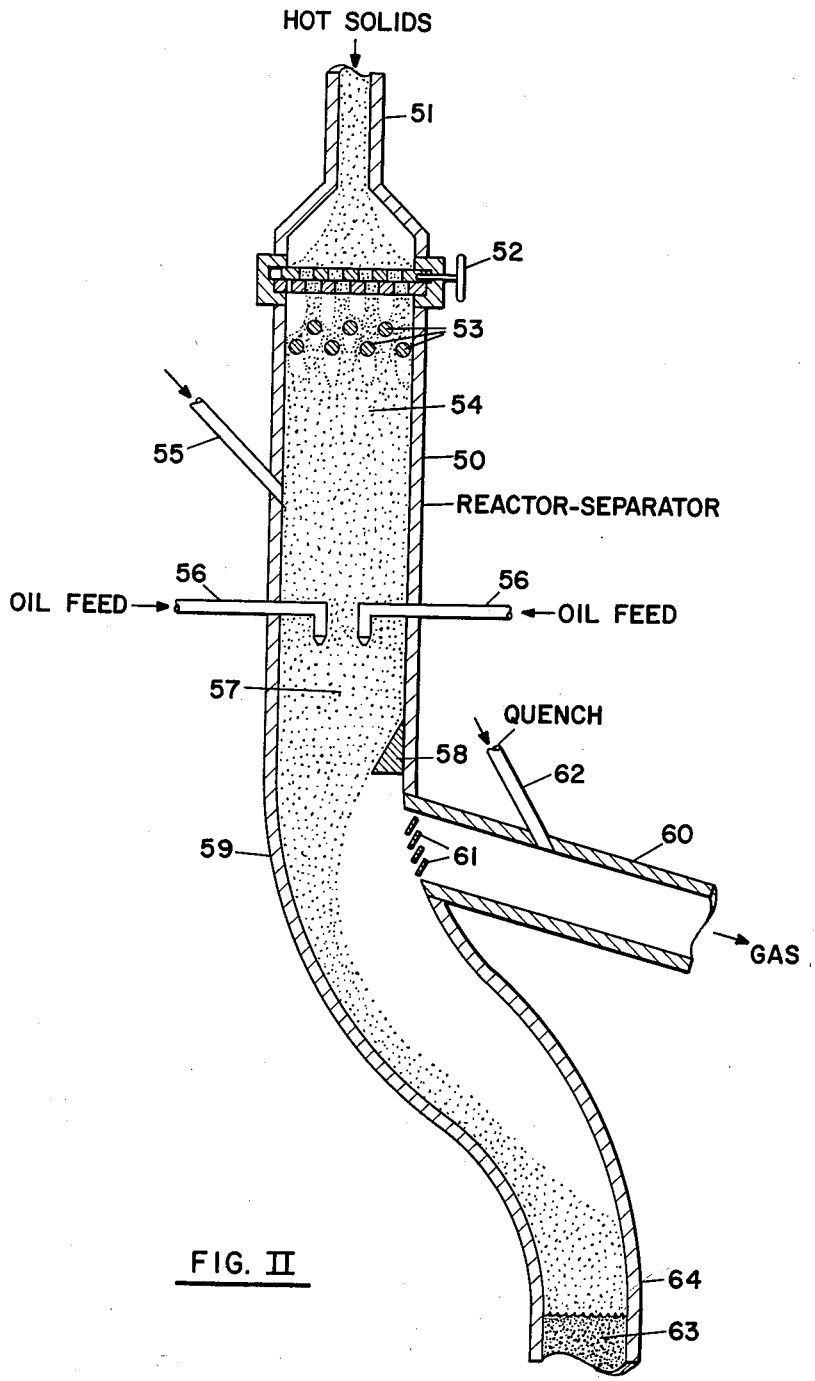
FIG. II

United States Patent Office 3,074,878
Patented Jan. 22, 1963

3,074,878
SHORT CONTACT TIME SYSTEM
George F. Pappas, Westfield, N.J., assignor to Esso Research and Engineering Company, a corporation of Delaware
Filed Oct. 18, 1957, Ser. No. 691,023
15 Claims. (Cl. 208—127)

The present invention relates to an improved method and apparatus for conducting short contact time hydrocarbon conversions. More particularly, it pertains to the rapid separation of gases and solids by taking advantage of inertial forces exerted by high velocity particles.

Within the past several years, there has grown an increasing demand for converting petroleum raw materials to higher valued products, for example, unsaturates such as ethylene and propylene, diolefins, etc., suitable for various chemical synthesis operations.

Towards the end of producing these more valuable product distributions, the transfer line, or dispersed solids, process has been developed. In this operation, a suitably preheated oil is fed into a rapidly moving stream of hot, particulate solids, normally at temperatures of about 1200 to 1600° F. Upon contact with the high temperature particles, the oil charge is converted to lighter distillates, valuable chemical intermediates, and carbonaceous residue which is deposited on the contact solids. After removing the solids from the gaseous stream, generally at least a portion of the coated solids are then circulated to a combustion zone wherein oxidation of the carbon deposits serve to heat the solids to requisite high temperatures.

Hydrocarbon oil feeds amenable to such operations inclue among other lighter materials, heavy crudes, atmospheric of vacuum bottoms, pitch, etc., or mixtures thereof.

However, in order to successfully convert the petroleum oils to unsaturate products, it is essential that the overall contact time between the reaction solids and the hydrocarbons be limited to extremely short periods, preferably less than 1.0 second. Since large quantities of solids are circulated through the reaction zone so as to supply the thermal requirements of the conversion step, not only must the combined reaction and separation time be kept to a minimum, but extremely high separation efficiency, e.g. 99.9% or better, must be obtained.

Numerous problems have been encountered in conventional operations using cyclonic separators. In the past, it has proven to be difficult to effect the rapid separation of gaseous products from the solids stream. Further, since a cyclonic separator actually removes the solids from the gases by imparting a spiral motion to the particles, considerable erosion of equipment has resulted from handling the large throughput of solid particles.

The present invention sets forth a unique separation procedure whereby a mixture of gases and solids is rapidly separated, and high solids recovery efficiencies are obtained. Briefly stated, solids are accelerated to a high downward velocity, thereby increasing their kinetic energy, and vaporous materials are laterally withdrawn and separated in response to the inertial forces exerted by the rapidly flowing solids stream.

In addition to the short separation times obtained, generally less than 0.25 second, there is an appreciable reduction in the amount of erosion encountered. Since gases are, in effect, being separated from a solids stream rather than the usual opposite operation, the solids continuing in their downward path, there is relatively little direct impingement of solid particles on structural surfaces. Hence, equipment repair and replacement is minimized.

In preferred embodiments, means for carrying out both reaction and separation steps in essentially a single unit are taught while obtaining the benefits of short contact times and high separation efficiency.

The present invention is particularly advantageous in that it sets forth process features for employing solids particles of a wide range of distributions for effecting short contact time. It permits the utilization of intermediate sized particles, i.e. in the range of 500 to 2500 microns, which were heretofore impractically large for fluidized systems, such as conventional transfer line coking, and relatively small for application to pebble or "shot" solids reactions.

Having briefly described the invention, reference to the drawings, description, and accompanying examples will further clarify its various features and modifications.

FIG. I depicts the separation zone of the present invention.

FIGS. II and III illustrate unitary vessels for accomplishing reaction and separation with short overall contact periods.

Turning to FIG. I there is shown separation unit 10 comprising primarily vertical, acceleration section 11 and gas withdrawal conduit 14. Conduit 14 is laterally disposed with respect to the main body of the separator.

The solids-gas mixture to be separated enters the upper portion of the separator through means not shown, such as a connecting passageway leading from a transfer line reactor or the like.

Generally the solids may be inert or catalytic and broadly range in size from 100 to 3,000 microns. Solids suitable for the present invention are carbonaceous particles, fluid coke, sand, glass or ceramic beads, activated clay, silica-alumina cracking catalysts, or the like.

For illustrative purposes, the solids-gas mixture is a dispersion of hot sand particles averaging 1,000 to 1,500 microns in size, at a temperature of 1350° F., and the gasiform conversion products are those of a transfer line type reaction zone.

The mixture, having a density of about 1 to 10 pounds per cubic foot, is downwardly passed into acceleration zone 11. While the drawing only indicates the utilization of gravity for increasing the velocity of the stream, gas such as high velocity steam may be introduced as a furmeans of effecting acceleration.

In order to impart sufficient kinetic energy to the solids so as to enable the gases to be effectively separated from them in response to the inertial forces exerted by their flow, it is normally necessary that the velocity of the solids be increased to a value of greater than 30 ft. per second as they pass the entranceway to gas withdrawal conduit 14. This velocity may, of course, be altered relative to the specific solids employed and the desired degree of separation. Generally, the necessary velocity varies inversely with the size and density of the particles.

As the solids dispersion passes downwardly, it is deflected by baffle element 12 and concentrated along separator wall 13 opposite to the entrance 16 of the gas withdrawal conduit. By thus concentrating the solids particles, drag effects which might tend to cause the solids to enter conduit 14 are compensated for. As an additional means of concentrating the solids stream opposite to conduit entrance 16, it is preferred to have wall 13 curve before entering the area of gas separation. This curvature also causes the particles to be accelerated outward, thus in effect making them heavier relative to the drag force which tends to cause them to pass into conduit 14. When employing a separation unit of 5 feet average diameter, a curvilinear wall of 10 to 15 feet radius of curvature is desired.

As the high velocity stream passes conduit inlet 16, the fast moving solids continue in their path due to their large downward inertia and accumulate in section 25 as will be further described, while gaseous materials pass laterally into the withdrawal passageway.

In order to further insure complete separation, a plurality of vanes 15, or similar means for altering the direction of gas flow, are fixed in entrance way 16. These vanes may be inclined at an angle of 30 to 45° with their axis, the resulting sharp change in the flow pattern of the gasiform material serving to de-entrain any solids which are present.

An efficacious design might employ a separation zone of rectangular or circular cross-section, the length across conduit entrance 16 being between 1.0 to 2.5 times the width of the main body of the separator.

As a mean of preventing gaseous materials from flowing downwardly out of the separation unit, a solids reservoir section 25 is maintained in the lower portion 23 of the separator. A weighted flapper valve 24 closes the end portion of the unit, the weight of the flapper valve being adjusted to support a sufficient level of solids in section 25 so as to provide a solids seal against downward gas flow. The flapper valve opens in response to solids accumulation and discharges the particles into solids hold-up vessel 26. Steam may be injected into the solids reservoir by line 27 to further prevent product loss.

The solids may be thereafter circulated from holdup vessel 25 to a burner, and thence to a reaction zone as is conventional in two-vessel conversion systems.

Returning to the actual separation of gaseous materials, the vapors pass through vanes 15 and into the main body of conduit 14. Normally, sufficient separation of solids has thus been effected to give a relatively solids-free product gas stream. Quench liquid, such as water, steam, light hydrocarbons, etc. is introduced through line 17 and serves to lower the gas temperature and prevent thermal degradation.

It may be desirable, when exceptionally high efficiency of separation is required, to utilize a second stage separator 18, vanes 19 being positioned at the entrance portion thereof. Alternatively, a straight through gas flow radial vane separator, cyclone or the like may be utilized. Additional solids separation is thus secured. Removed particles pass into collection hopper 21 from which they may be discharged by line 22. The slope of conduit 14 may be adjusted to discharge separated solids into hopper 21 or section 25.

Gasiform material is quenched by means of coolant introduced through line 20, the quenched gases being thereafter sent to product recovery operations such as scrubbing, fractionation, crystallization, etc. as is well known in the art.

By operating according to the above description, separation periods of 0.25 second may be obtained when using a two-stage separation unit, and 0.10 second for a single-stage separator.

Turning to FIG. II, there is shown a single vessel reactor-separator 50 of the present invention.

Hot contact solids from a heater or burner zone, not shown, are introduced at reaction temperatures into the upper portion 51 of the vessel. The heater may be a fluid bed or a transfer line burner, shot heater, etc.

As the solids enter into the main body of the reaction vessel, they are uniformly distributed across its area by means of multiple distribution valves or plates 52 or similar distribution means. To further insure uniformity of solids distribution, bounce bars 53 may be positioned as indicated. Generally, it is desirable to form a disperse, downwardly moving solids phase of approximately 0.5 to 10 lb./cu. ft. density.

The solid particles then pass into an acceleration zone 54 wherein their velocity is increased by their free fall in response to the force of gravity and/or by means of propelling gas, such as heated steam introduced by line 55. Thereafter, a suitably preheated, e.g. 700° F., hydrocarbon oil feed such as a South Louisiana 3% residuum of initial boiling point 1000° F., is injected, preferably downwardly, into the flowing solids stream by means of multiple nozzles 56 or other conventional injection apparatus. Oil feed is generally introduced at a relatively high gas velocity, e.g. 60 ft./second, thereby acting as a means for accelerating the solids to requisite high kinetic energy levels.

While the drawing illustrates injection of feed after the solids have undergone substantial acceleration in zone 54, it may be desirable under certain conditions to introduce the oil feed earlier in the contact particle path, and thereafter accelerate the entire mass.

The oil, upon contact with the solids in zone 57, is converted to light vaporous conversion products, normally including substantial portions of olefins and diolefins.

The gas-solids mixture is then deviated from its downward path by deflector element 58, and concentrated along inner wall 59 opposite the entrance to gas withdrawal conduit 60. As noted in the description of FIG. I, wall 59 is preferably curved as an additional means of prohibiting lateral drag of solids into conduit 60.

As the high velocity mixture, i.e. particle velocities of greater than 30 ft./second, passes withdrawal conduit 60, gaseous materials are laterally withdrawn and separated from the downflowing solids. It is desirable, though not mandatory, to employ vanes 61 or similar devices which sharply alter the direction of the gases, thus de-entraining any solids tending to enter the area of gas removal. If desired, additional solids separation stages may be utilized. The vapors are thereafter quenched by cooling fluid admitted by line 62 as is well known in the art and passed to conventional recovery means.

As formerly described, a solids seal 63 is maintained in portion 64 of the vessel, thus insuring complete lateral withdrawal of gases. The solids may be then sent to a reservoir zone, passed to a heater or the like, and recirculated through the system.

Overall contact times between hydrocarbons and solids of less than 1.0 second, preferably of the order of 0.35 second are thus secured, separation time alone being in the range of 0.10 to 0.25 second.

FIG. III depicts a particularly effective, short contact time reaction-separator system employing counter-current flow of rapidly moving solids and vapors.

A stream of heated solids, as from a heater or burner vessel, is introduced into the upper section 101 of the reactor vessel 100. By application of distribution valve 102 and bounce bars 103, it is then uniformly distributed across the cross-section of the reactor so as to form a dilute particle phase of about 0.5 to 10 lb./cu. ft. density. Normally, the solids employed in the system of FIG. III would be relatively coarse, i.e. 1000–3000 microns, preferably about 2500 microns in size, so as to secure desired separations.

The solids pass through acceleration zone 104 wherein their velocity is sufficiently increased by gravitational force, propelling gas, or otherwise, so that they pass entrance 109 to solids withdrawal passageway 106 at a speed greater than 30 ft./second. Generally, it is necessary to slightly taper surface 105, or use other deflector means. The contact particle stream is thereby slightly deviated from its natural downward path, and an area of low solids concentration is formed in the immediate vicinity of entranceway 109.

Counter-current to the flow of solids, a preheated hydrocarbon oil feed is introduced into the lower portion 107 of the vessel, preferably at a relatively high velocity, e.g. 20 to 40 ft./second, by conventional means such as multiple injector 108. Heated steam may be additionally introduced as an oil dispersion and propelling medium. Contact with the heated, downwardly moving solids stream converts the oil to gasiform material and carbon residue which is deposited on the solid particles. The gasiform material is thereafter quickly laterally withdrawn from the solids stream into conduit 106, the downward inertia of the solids carrying them into the solids reservoir 110. As previously noted, reservoir 110 serves as a gas seal thereby insuring complete lateral withdrawal separation of product vapors. Separated gases may be thereafter quenched, subjected to a second stage recovery operation, or treated in other conventional manners.

The design of FIG. III is particularly desirable in that the overall contact time between solids and hydrocarbons is extremely short, generally less than 0.25 second, preferably of the order of 0.15 second. Separation time alone is in the range of .05 to 0.15 second. Both hydrocarbons and solids are moving in opposite directions at high velocities in a relatively small contact zone, and hence this type of operation affords excellent short reaction time conditions.

Further, due to counter-current high velocity flow, it is normally not necessary to use additional structures such as vanes or the like in entranceway 109. Of course, they may be inserted, if desired.

The following table presents a compilation of pertinent data applicable to the systems described:

*Table I*

|  | Broad range | Preferred range | Example |
|---|---|---|---|
| Solids size range, microns | 100–3,000 | 500–2,500 | 1,000–1,500 |
| Average solids temp., °F | 900–2,500 | 1,100–1,800 | 1,350 |
| Solids density after distribution, lb. cu. ft. | 0.5–20 | 1–10 | 5 |
| Minimum solids velocity across gas withdrawal conduit entranceway, ft./sec. | 30 | 35 | 35 |
| Minimum solids recovery efficiency, percent | 99.0 | 99.9 | 99.95 |
| Separation time in separator of Fig. I, seconds | 0.10–0.5 | 0.10–0.25 | 0.15 |
| Overall contact time in reactor-separator of Fig. II, seconds | 0.15–1.0 | 0.3–0.5 | 0.35 |
| Separation time in Fig. II, seconds | 0.10–0.50 | 0.10–0.25 | 0.10 |
| Overall contact time in reactor-separator of Fig. III, seconds | 0.10–1.0 | 0.25–0.35 | 0.25 |
| Separation time in Fig. III, seconds | 0.05–0.50 | 0.05–0.15 | 0.05 |

The present invention offers numerous advantages. It enables extremely short contact time solids reaction, and separation of the gaseous products formed. By separating the gases from the solids stream without necessitating major directional changes of the contact particles, relatively little structural erosion occurs. A wide size range and type of solids may be effectively utilized in a short contact period conversion system.

What is claimed is:

1. In a short contact time hydrocarbon conversion process wherein hydrocarbon oil is contacted with a rapidly moving stream of disperse solids heated to reaction temperature, thereby converting said oil to vaporous materials and carbonaceous residue which deposits on said solids, the improved method of rapidly separating said vaporous materials and contact solids within a period of 0.10 to 0.25 second which comprises downwardly passing said mixture of converted vaporous materials and solids through a separation zone so as to accelerate said solids to a velocity greater than 30 ft./second, concentrating said solids along a vertical boundary of said separation zone so as to form a vertically disposed section of high solids concentration and an oppositely directed section of low concentration, and laterally withdrawing said vaporous materials through a confined passageway from the section of low solids concentration in response to the inertial forces exerted by said rapidly flowing solids and recovering said separated vaporous materials.

2. The improved method of claim 1 wherein said contact solids are at a temperature greater than 1200° F. and said vaporous materials contain a substantial proportion of unsaturated hydrocarbon products.

3. The improved method of claim 1 wherein an upward component of motion is given said downwardly flowing vaporous materials at substantially the position wherein they are laterally withdrawn from said section of low solids concentration.

4. A process for rapidly contacting hydrocarbon oil with reaction solids which comprises downwardly flowing a mass of solids heated to a conversion temperature through a vertically disposed reaction zone, distributing said solids across the cross-sectional area of said zone so as to form a relatively uniform disperse mass of solids, downwardly accelerating said mass to impart a relatively high velocity to said solids, downwardly injecting a suitably preheated hydrocarbon oil feed into contact with said mass, said oil being thereby converted to gaseous materials and carbonaceous residue which deposits on said solids, concentrating said solids along a vertically disposed boundary of said reaction zone, withdrawing and recovering said gaseous materials through a laterally disposed confined passageway oppositely positioned with respect to said boundary of said reaction zone, and continuing the downward flow of solids whereby overall contact time between hydrocarbons and solids is maintained less than 1.0 second.

5. The process of claim 4 wherein an upward component of motion is given said downwardly moving gaseous materials at their point of withdrawal through said laterally disposed confined passageway.

6. A process for rapidly converting hydrocarbon oils which comprises introducing hot solids at a reaction temperature into the upper portion of a vertically disposed reaction zone for downward movement therethrough, distributing said solids across the cross-sectional area of said reaction zone to form a relatively uniform, relatively disperse downwardly moving stream of solids, accelerating said stream so as to impart a velocity greater than 30 ft./second to said solids as they cross an intermediate section of said vertically disposed reaction zone, upwardly injecting a suitably preheated hydrocarbon oil feed into the lower portion of said reaction zone so as to contact said oil with said downwardly flowing solids stream thereby converting said oil to initially upwardly moving gasiform material and carbonaceous residue, and laterally withdrawing said gasiform material from said intermediate section of said reaction zone in response to the inertial forces exerted by said downwardly moving solids stream so that the overall contact time between hydrocarbons and hot solids is less than about 0.35 second.

7. The process of claim 6 wherein said solids stream is laterally deflected away from the point of withdrawal of said gasiform material.

8. A short contact time hydrocarbon conversion process which comprises contacting hydrocarbon oil with a rapidly downwardly moving stream of disperse solids to convert said oil at a temperature between about 1200° F. and 1600° F. to vaporous materials containing unsaturated hydrocarbons and carbonaceous residue which deposits on said solids, rapidly separating said converted vaporous materials from said contact solids within a period of 0.10 to 0.25 second while downwardly passing said mixture of vaporous materials and solids through a separation zone so as to accelerate said solids to a velocity greater than about 30 ft. per second, concentrating said solids along a vertical boundary of said separation zone so as to form a vertically disposed section of high solids concentration and an oppositely directed section of low solids concentration, laterally withdrawing said vaporous materials from the section of low solids concentration through a confined passageway and passing said separated solids down into a collection zone.

9. A process according to claim 8 wherein an upward component of motion is given said downwardly flowing vaporous materials at substantially the region wherein they are laterally withdrawn from said section of low solids concentration.

10. A process for rapidly contacting hydrocarbon oil with contact solids which comprises downwardly flowing a mass of solids heated to a conversion temperature through a vertically disposed reaction zone maintained at a temperature between about 1200° and 1600° F., distributing said solids across the cross-sectional area of said reaction zone so as to form a relatively uniform downwardly flowing disperse mass of solids, downwardly accelerating said mass to impart a relatively high velocity to said solids, downwardly injecting preheated hydrocarbon oil feed into contact with said downflowing mass, converting said oil at a temperature between about 1200° F. and 1600° F. to gaseous hydrocarbons and carbonaceous residue which deposits on said solids, concentrating said solids along a vertically disposed boundary of said reaction zone, withdrawing said gaseous hydrocarbons through a laterally disposed passageway oppositely positioned with respect to said vertically disposed boundary of said reaction zone, and continuing the downward flow of solids to a collecting zone whereby overall contact time between hydrocarbons and solids is maintained less than 1.0 second.

11. The process of claim 10 wherein an upward component of motion is given said downwardly moving gaseous hydrocarbons at their point of withdrawal through said laterally disposed passageway.

12. In a short contact time high temperature reaction wherein reactant gaseous material is contacted with a rapidly downwardly moving stream of disperse hot solids, the improved method of rapidly separating hot gaseous material and contact solids within a period of 0.10 to 0.25 second which comprises downwardly passing said mixture of gaseous material and solids through a continuous unitary vertically arranged separation zone so as to accelerate said solids to a high velocity, concentrating said solids along a vertical boundary of said separation zone so as to form a vertically disposed section of high solids concentration and an oppositely directed section of low solids concentration, and laterally withdrawing said gasiform material through a confined passageway extending outwardly from the section of low solids concentration in response to the inertial forces exerted by said rapidly downwardly moving solids and recovering said separated solids.

13. A process for rapidly contacting reactant gaseous material with solids which comprises downwardly passing a mass of solids heated to an elevated temperature through a vertically disposed contacting zone, distributing said solids across the cross-sectional area of said contacting zone so as to form a relatively uniform disperse mass of solids, downwardly accelerating said mass of solids to impart a relatively high velocity to said mass of solids, injecting a gaseous material into contact with said mass, concentrating said solids laterally along a vertically disposed boundary of said contacting zone, withdrawing and recovering gaseous material through a laterally disposed confined passageway oppositely positioned with respect to said concentrating boundary of said contacting zone, and continuing the downward flow of solids whereby overall contact time between the introduced gasiform material and solids is maintained less than 1.0 second.

14. An improved combined conversion-separation unit which includes a substantially vertical vessel, a laterally disposed gas withdrawal conduit extending from an intermediate portion thereof, means for downwardly introducing a disperse stream of solids, a vertical acceleration zone for increasing the velocity of said disperse stream of solids prior to their passing said gas withdrawal conduit, a solid baffle deflector arranged on the wall of said vessel above said withdrawal conduit to deflect solids away from the entrance to said conduit, and means positioned below said withdrawal conduit for upwardly injecting hydrocarbon oil countercurrent to said solids stream.

15. An improved combined conversion-separation unit which comprises a substantially vertical vessel, a laterally disposed gas withdrawal conduit extending from an intermediate portion thereof, means for downwardly introducing a disperse stream of solids, a vertical acceleration zone for increasing the velocity of said solids prior to their passing said gas withdrawal conduit, a solids baffle deflector arranged on the wall of said vessel above said withdrawal conduit to deflect solids away from the entrance to said conduit, said vessel having a curved wall below said baffle deflector and opposite the inlet to said withdrawal conduit and curved toward said conduit for concentrating solids along the wall of said vessel, opposite said gas withdrawal conduit, and means for downwardly introducing hydrocarbon oil into said vessel at a region above said withdrawal conduit.

References Cited in the file of this patent

UNITED STATES PATENTS

| | | |
|---|---|---|
| 2,249,924 | Wilson | July 22, 1941 |
| 2,325,136 | Kassel | July 27, 1943 |
| 2,698,672 | Burnside et al. | Jan. 4, 1955 |
| 2,836,398 | Linderoth | May 27, 1958 |
| 2,894,899 | Crawley | July 14, 1959 |
| 2,906,695 | Boston | Sept. 29, 1959 |